Patented Nov. 25, 1952

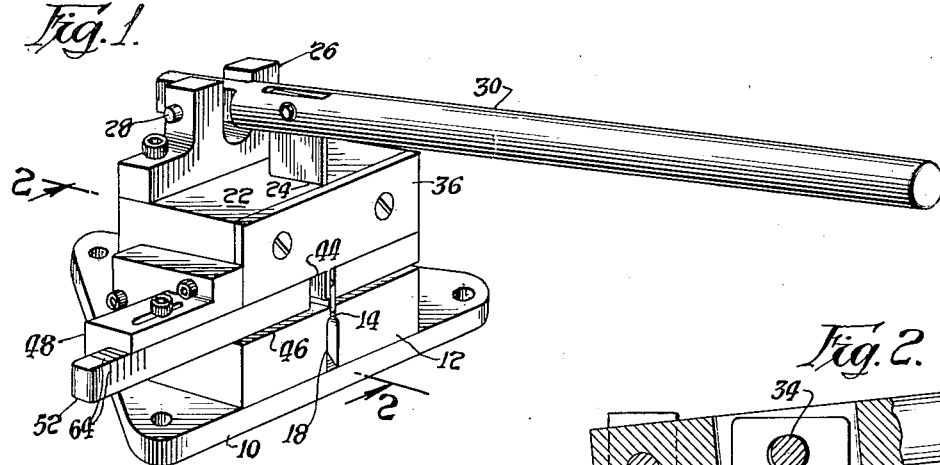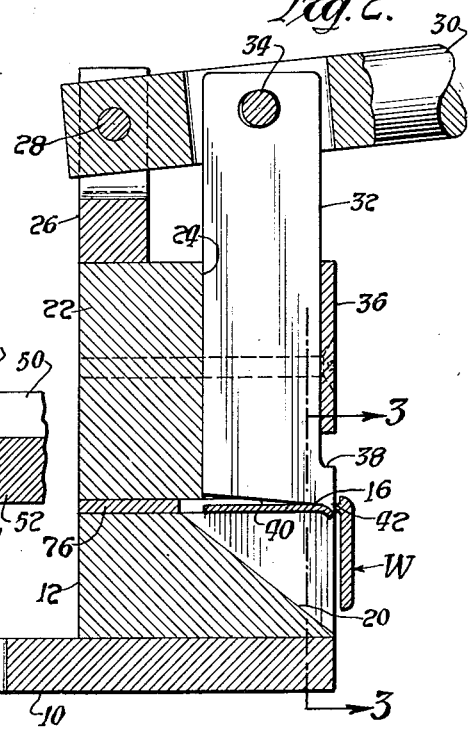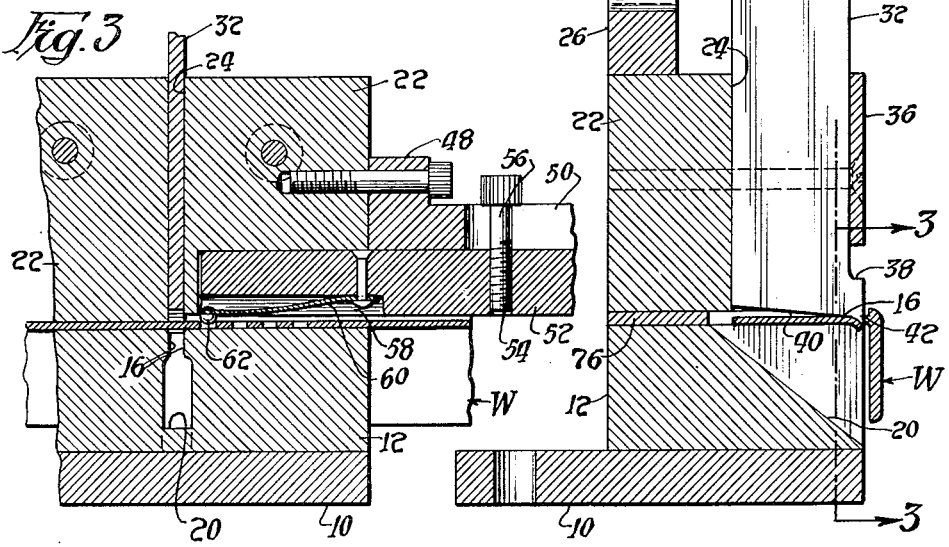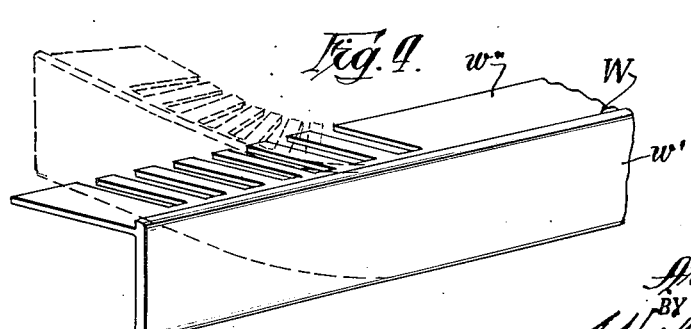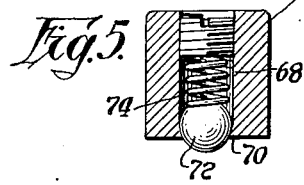

2,619,172

UNITED STATES PATENT OFFICE 2,619,172

NOTCHING TOOL

Arthur E. Flittner, Arcadia, Calif.

Application June 29, 1950, Serial No. 171,079

2 Claims. (Cl. 164—50)

This invention relates to a notching tool and more particularly to a device for notching finishing mouldings of the type commonly employed as binding for linoleum and like materials on table and counter tops.

It frequently happens in the construction of tables, counter tops and the like that the corners thereof are rounded with the result that the finish moldings employed to cover the raw edge of the top covering material must be bent to conform to the contour of the top of the article. In order to effect such bending of the molding, it becomes necessary to notch one of the flanges thereof so as to avoid buckling of the molding and to produce a smooth cure on the exposed surface thereof. The notching of such moldings has heretofore been accomplished by the use of a pair of snips employed for cutting out portions of one of the flanges, with the result that the spacing between the notches was frequently irregular, producing ripples and similar irregularities in the finished surface of the molding, thus impairing the appearance of the finished product.

The primary object of this invention is to facilitate the notching of the base flange of a conventional finish molding and to produce in the finished product a professional appearance.

Another object is to assure uniformly spaced notches of uniform shape and size in the base flange of a strip of molding so as to assure the bending of the finished flange thereof smoothly around the curvature of the top of the article being covered.

The above and other objects may be attained by employing this invention which embodies among its features an anvil upon which the base flange of the molding to be notched is supported, a blade movable perpendicularly to the flange above the supporting anvil for shearing a portion of the base flange of a strip of molding supported by said anvil, and means carried by the anvil for engaging the base flange and resisting longitudinal movement of the molding on said base flange.

In the drawings:

Figure 1 is a perspective view of a notching tool embodying the features of this invention, Figure 2 is a sectional view taken substantially along the line 2—2 of Figure 1, Figure 3 is a sectional view taken substantially along the line 3—3 of Figure 2, Figure 4 is a perspective view of a strip of molding which has been notched by the use of this improved notching tool, and Figure 5 is a fragmentary sectional view through a modified form of carriage employed with this notching tool.

Referring to the drawings in detail a base 10 has secured thereto in any suitable manner an anvil block 12 which is of substantially rectangular form and is provided intermediate its ends with a perpendicular slot 14, opposite side edges 16 of which at their junctions with the top of the block 12 form spaced parallel shearing edges. The lower end of the slot 14 enters an enlarged slot 18 having an inclined bottom 20, and both the slots 14 and 18 open outwardly through the front face of the anvil block 12, so that material sheared against the shearing edges 16 will fall into the enlarged slot 18 and slide down the inclined bottom 20 thereof to be discharged from the anvil block. Supported on the top of the anvil block 12 is a guide block 22 which is formed intermediate its ends with a slot 24 which opens through the top of the guide block and aligns at its lower end with the slot 14. Carried by the guide block 22 is an upwardly extending bracket 26 upon which is pivotally supported as at 28 a hand lever 30. A shear blade 32 is pivotally and slidably connected as at 34 to the hand lever 30 and slides vertically in the slot 24. A guide plate 36 is attached to the front face of the guide block 22 and overlies the front edge of the blade 32 in order to maintain said blade in proper position in the slot 24. Formed adjacent the lower end of the blade 32 and projecting outwardly beneath the lower edge of the plate 36 is a shoulder 38 which forms a stop to limit the upward movement of the blade 32 within the slot 24. The lower edge of the blade 32 inclines upwardly as at 40 as it recedes from the front edge of the blade, and cooperates with the shearing edges 16 in shearing the material to be cut. In the preferred form of the invention the extreme forward edge of the blade 32 is provided with an extension 42 which projects downwardly and is the first portion of the blade to contact the work so as to effect a perforation of the work prior to the engagement of the inclined edge 40 of the blade with the work, to thus start the shearing of the material from the work.

In order to facilitate the production of uniformly spaced notches in the work, without requiring the use of an extraneous measuring implement, I form in one side of the guide block 22 an elongated recess 44 which extends into the block from one end thereof and communicates with the slot 46 formed between the blocks 12 and 22 in which the flange of the work is supported.

A suitable bracket arm 48 is attached to the guide block 22 at the end thereof adjacent the recess 44, and formed in this bracket arm is a longitudinally extended elongated slot 40. Mounted for sliding movement beneath the bracket arm 48 and extending into the recess 44 is a gage bar 52 which is provided with an internally screw threaded opening 54 for the reception of a screw 56 which projects through the slot 50 and threadedly engages the opening 54 in order to hold the bar 52 in various adjusted positions relative to the blade 32. This gage bar is provided at the end which enters the recess 44 with an elongated groove 58 which opens through its bottom as will be readily understood upon reference to Figure 3. A leaf spring 60 is secured to the top of the groove 58 adjacent the end thereof remote from the blade 32, and carried by the spring 60 adjacent the end thereof nearest the blade 32 is a spherically shaped downwardly extending head 62 which bears on the work which rests on the anvil block 12. The gage bar 52 is provided adjacent its outer end with suitable indices 64 so that by loosening the screw 56 the bar may be moved toward or away from the blade 32 a known distance.

In the modified form of the invention illustrated in Figure 5 a gage bar 66 corresponding in size and shape to the carriage 52 is employed, but instead of the recess 58, the gage bar 66 is provided with a vertical bore 68 having adjacent its lower end an inwardly extending shoulder 70 against which a sphere 72 is held by a compression coil spring 74 so that a portion of the ball or sphere 72 will project below the lower edge of the bar 66 and contact work held in the slot 46.

In use the work W comprising a finish flange w' and base flange w" is placed in the notching tool by introducing the flange w" into the slot 46 so that it rests upon the anvil block 12. Upon moving the handle 30 downwardly, it will be evident that the blade 32 will be advanced toward the shearing edges 16 of the anvil block 12 and the perforating lug 42 will be forced through the base flange w", after which the inclined bottom edge 40 of the blade acting against the shearing edges 16 will shear out a narrow strip of the flange w", so as to cause it to drop through the slot 14 and into the enlarged slot 18 to be discharged down the inclined bottom 20 thereof out through the front face of the anvil block 12. Upon elevating the blade 32, the work W is shifted until the spherical head 62 encounters the walls of the notch previously cut whereupon the blade 32 is again moved downwardly to produce a second notch. The operation is then repeated until the desired number of uniformly spaced notches have been produced in the base flange w", and it will be evident that the molding W may be bent as suggested by the dotted lines in Figure 4 so as to produce a smooth curve of the finish flange w'.

In the preferred form of the invention, the slot 46 is formed by using a suitable spacer 76 between the anvil block 12 and the guide block 22.

While in the foregoing there has been shown and described the preferred form of this invention, it is to be understood that minor changes in the details of construction, combination and arrangement of parts may be resorted to without departing from the spirit and scope of the invention as claimed.

I claim:
1. In a notching tool, a flat base, an anvil block mounted on the base and having a vertical slot opening through its front and top faces intermediate the ends thereof, the bottom of said slot sloping upwardly and inwardly, a spacer element supported on the anvil block at the rear end of said slot and extending parallel to the front face of the anvil block, a guide block supported on said spacer element in overlying relation with respect to the anvil block to provide a work receiving slot between the portions of the same extending beyond the front edge of the spacer element, said guide block having a vertical slot opening through its front, top and bottom sides in line with the first slot, a guide plate secured on the front side of the guide block in overlying relation with respect to the guide block slot, a cutting blade depending through the latter slot and having an inclined bottom edge for shearing cooperation with the top edges of the first slot, a bracket mounted on the top side of the guide block, and a hand lever pivoted at its rear end to said bracket and at an intermediate point to the upper end of the cutting blade.

2. The invention as defined in claim 1, with the said guide block having a recess formed in its lower side and opening through its front side, said recess extending laterally from a point adjacent the top of the first slot and opening through an end of the guide block, a bracket secured on the said end of the guide block and having a bottom face extending in continuation with the top side of said recess, and spring tensioned means carried by the inner end of the gage bar to bear on the work as it is fed through the said receiving slot, said gage bar having indices delineated on the front side of the outer end portion thereof for cooperation with the outer end of the bracket, said indices being spaced apart corresponding to the required spacing of the notches to be formed in the work.

ARTHUR E. FLITTNER.

REFERENCES CITED

The following references are of record in the file of this patent:

UNITED STATES PATENTS

| Number | Name | Date |
|---|---|---|
| 43,458 | Moseley | July 5, 1864 |
| 383,692 | Beck | May 29, 1888 |
| 1,033,527 | Bradshaw | July 13, 1912 |
| 1,495,989 | Danly | June 3, 1924 |
| 1,907,000 | Parr | May 2, 1933 |
| 2,078,706 | Boker | Apr. 27, 1937 |
| 2,431,482 | Hutchinson | Nov. 25, 1947 |

FOREIGN PATENTS

| Number | Country | Date |
|---|---|---|
| 28,799 | Great Britain | Dec. 21, 1911 |
| 117,168 | Great Britain | July 11, 1918 |
| 18,308 of 1929 | Australia | May 20, 1930 |